Dec. 25, 1945.    A. J. FETTIG    2,391,825
CALCULATING MACHINE
Filed Jan. 31, 1942    5 Sheets-Sheet 1
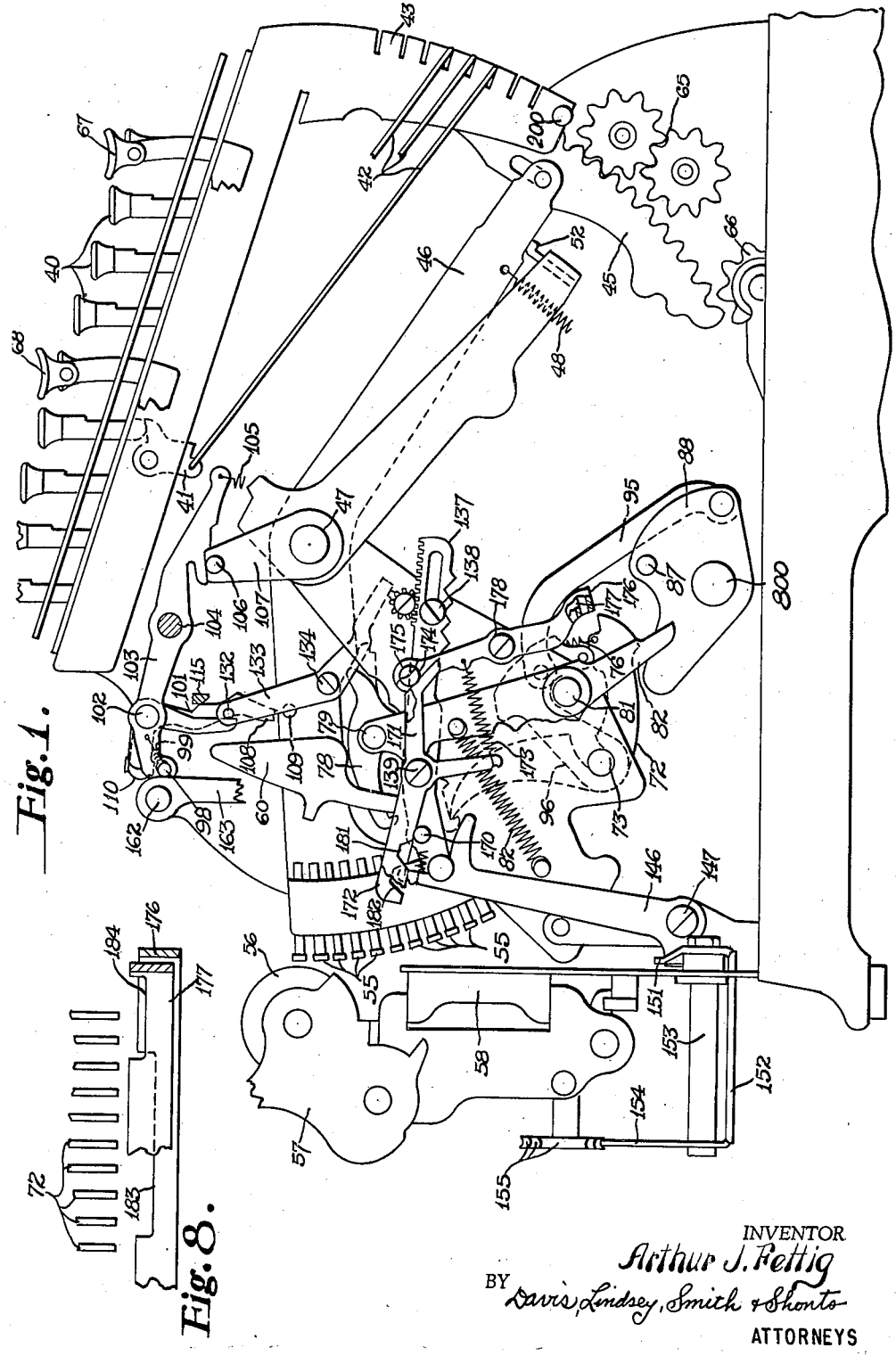
INVENTOR
Arthur J. Fettig
BY Davis, Lindsey, Smith & Shonts
ATTORNEYS

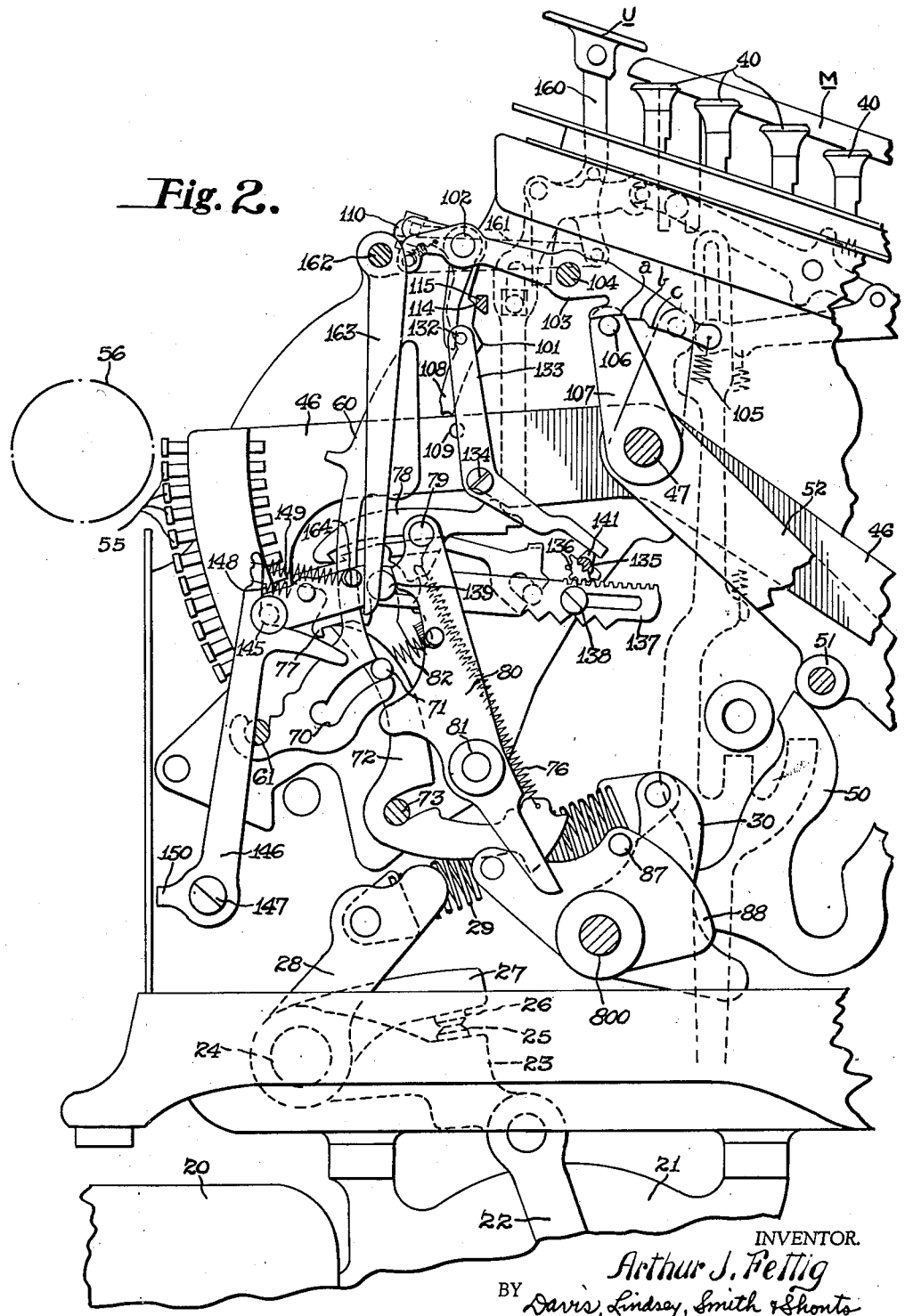

Dec. 25, 1945.  A. J. FETTIG  2,391,825
CALCULATING MACHINE
Filed Jan. 31, 1942  5 Sheets-Sheet 3
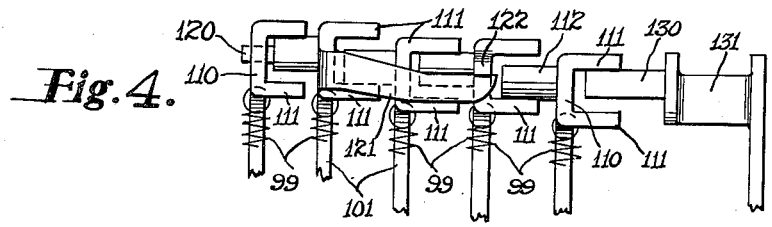
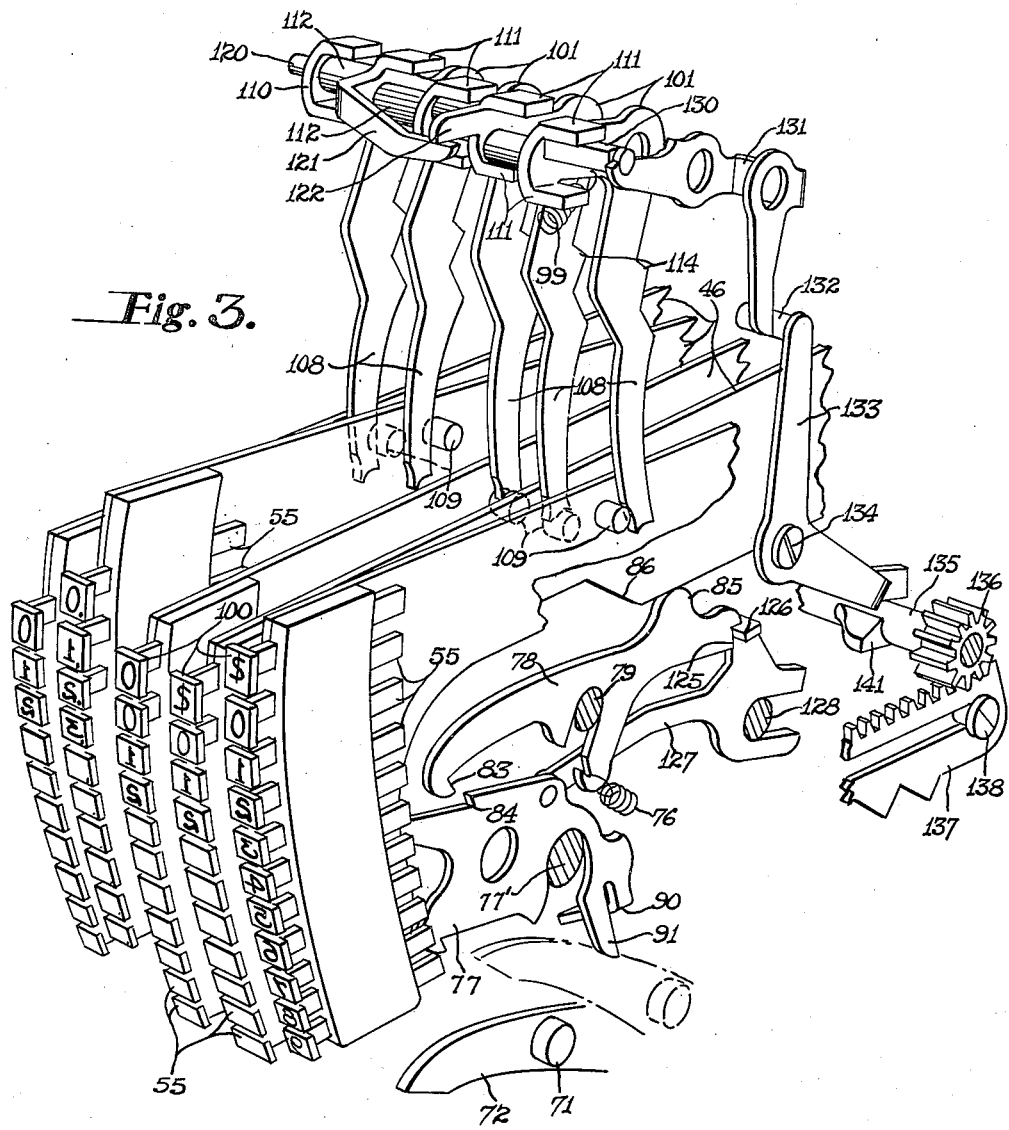
INVENTOR.
Arthur J. Fettig
BY Davis, Lindsey, Smith & Shonts
ATTORNEYS

NORMAL $1.00

$10.00

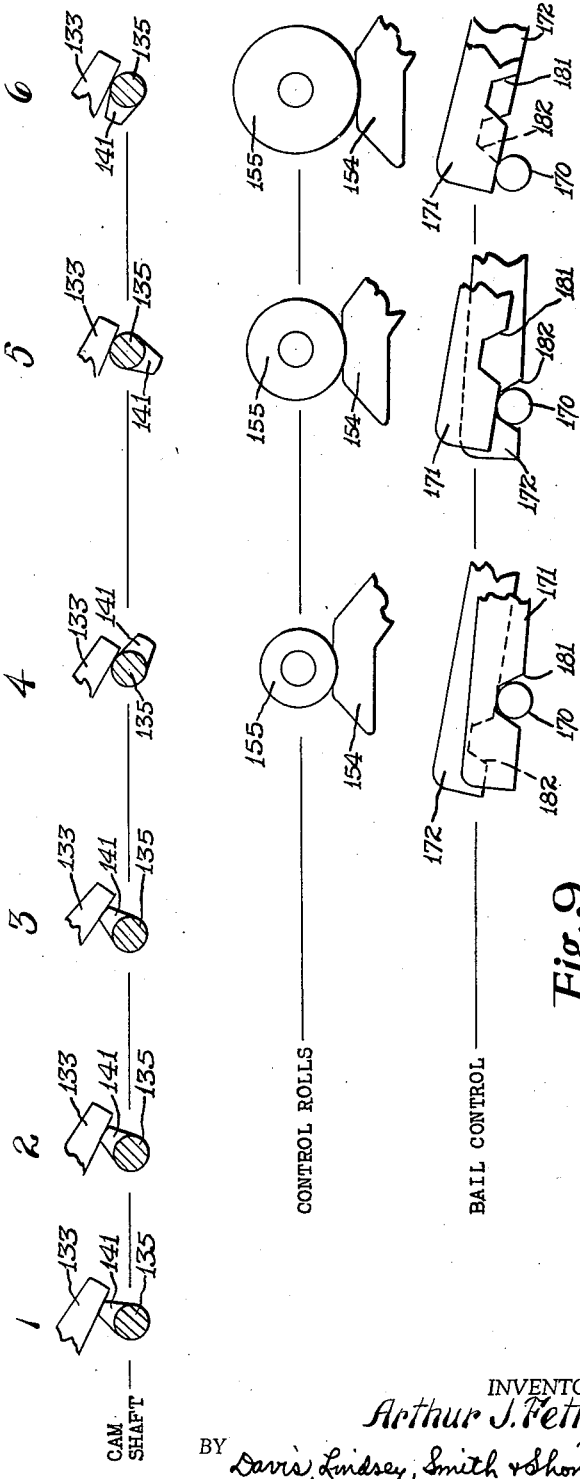

Patented Dec. 25, 1945

2,391,825

UNITED STATES PATENT OFFICE 2,391,825

CALCULATING MACHINE

Arthur J. Fettig, Detroit, Mich., assignor to Burroughs Adding Machine Company, Detroit, Mich., a corporation of Michigan Application January 31, 1942, Serial No. 428,989

19 Claims. (Cl. 101—93)

This invention relates to calculating machines and is concerned more particularly with an improved safeguard printing control means therein.

Calculating machines are frequently used for filling in on check forms the amounts of the checks. The machine may also either calculate the amounts of the checks or/and accumulate a total of the amounts of checks filled in by the machine. In printing the amounts of the checks on the check forms, so-called safeguard symbols or characters should be printed to the left of the figures representing the amounts in order to render difficult any fraudulent alterations of the amounts thus printed on the check forms. However, it is also frequently desirable that such calculating machines should be capable of being used for other work as, for example, printing of amounts and totals of successive series of amounts without printing to the left of such amount unnecessary symbols or characters which would render the printed amounts less easy to read and might cause confusion. Particularly in the case of calculating machines having traveling paper carriages and used for filling in amounts on check forms and concurrently producing business records of data relating to the issuance of checks on which the amounts are thus filled in, it is desirable that safeguard symbols or characters be printed to the left of the amounts when the latter are printed on the check forms but that no unnecessary characters be printed to the left of the amounts when the latter are printed on the ledger, journal or other record papers.

In prior machines provided with means for controlling the printing of safeguard symbols, such safeguard symbol printing control means have been more or less complicated and more or less limited in their adaptabilities to various kinds of work.

It is an object of the present invention to provide a calculating machine with an improved safeguard printing control means of relatively simple and inexpensive construction.

It is a further object of the invention to provide a calculating machine with a safeguard printing control means of relatively easy manufacture and assembly so arranged in the machine as to be readily accessible for inspection, adjustment, alteration and/or repair.

It is a further object of the invention to provide a calculating machine with a safeguard printing control means adaptable to a great variety of work.

It is a further object of the invention to provide a calculating machine with a safeguard printing control means of such construction and operation as to eliminate interference between the safeguard printing control and other functions of the machine.

A preferred embodiment of the invention is illustrated in the accompanying drawings, in which:

Figure 1 is a left-side elevation of a Burroughs "high keyboard" machine with the usual case thereof removed and showing portions of the safeguard printing control means of the present invention and other portions of the machine relevant to a full disclosure of the present invention;

Fig. 2 shows a portion of Fig. 1 on larger scale to illustrate more clearly portions of the structure of the safeguard printing control means and of other elements of the machine closely associated therewith, the parts being shown in positions occupied while the machine is at rest and the safeguard printing control means "normalized" or disabled;

Figure 5:
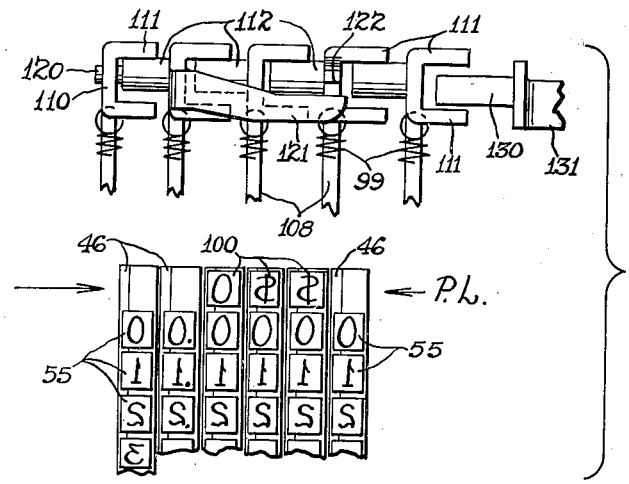
Figure 6:
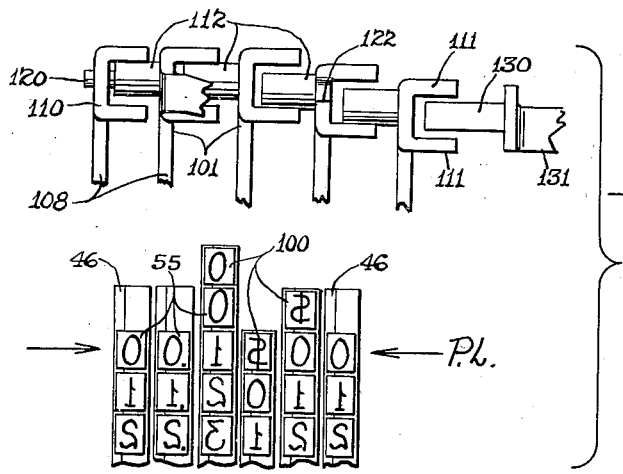
Figure 7:
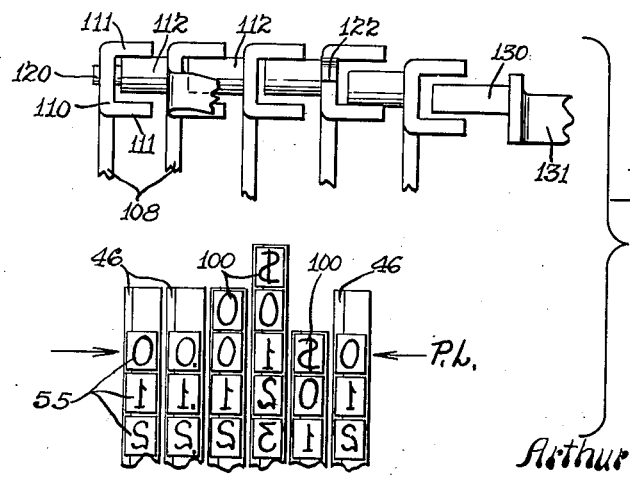

Fig. 3 is a perspective view of portions of the printing mechanism of the machine of Fig. 1 and of portions of the safeguard printing control means of the present invention, the parts being shown in the positions assumed during the machine operation as the printing hammers (not shown in this figure) are "fired" for the printing of characters representing an amount of ten cents and with the safeguard printing control means in effective or enabled condition;

Fig. 4 is a rear elevation of portions of the safeguard printing control means in the positions in which they are shown in Fig. 3;

Fig. 5 is a rear elevation of the portions of the safeguard printing control means shown in Fig. 4 and showing such parts in the normal positions which they occupy while the machine is at rest, and also shows the type carriers of the printing mechanism in the normal positions which they occupy relative to the printing line while the machine is at rest;

Fig. 6 is a view similar to Fig. 5 showing the positions of the parts during the operation of the machine just prior to and at the time of the printing of characters representing an amount of one dollar;

Fig. 7 is a view similar to Figs. 5 and 6, but illustrating the parts in the positions which they occupy during the operation of the machine just prior to and at the time of the printing of the characters representing an amount of ten dollars;

Fig. 8 shows a detail of the hammer block control by which printing is eliminated in selected groups of orders in selected columns of the work forms; and Fig. 9 shows a sample of work performed on a machine equipped with the invention and also shows diagrammatically the set-up of the carriage controls of the safeguard printing and hammer block control means used for the illustrated example of work.

Although the invention is illustrated as applied to a Burroughs "High Keyboard" calculating machine, it will be apparent that the invention may be applied also to other styles and models of calculating machines.

General construction

The general construction of the illustrated Burroughs "High Keyboard" machine is well known and is, furthermore, disclosed in detail in numerous prior patents and so will not be described in detail herein except as necessary to a clear understanding of the present invention.

As usual with Burroughs "High Keyboard" machines, the machine illustrated herein may be driven manually by a hand crank (not shown), but is preferably driven through cycles of operation by a motor drive substantially as disclosed in Vincent Patent 866,750 and comprising an electric motor 20 and a single revolution clutch mechanism which is contained in a housing 21 and which, together with a switch and motor supply circuit (not shown), is controlled in the usual way by one or more motor bars such as M and U and one or more "live" function control keys. The output crank shaft (not shown) of the clutch is connected through a link 22 with an arm 23 pivoted loosely on the shaft 24 and having an abutment element 25 cooperating with an abutment element 26 on an arm 27 secured to the shaft 24. During the first half of the revolution of the clutch, that is, during the forward stroke of a machine cycle, the arm 23 is driven counterclockwise through the clutch and link 22 whereby the arm 27 and shaft 24 are likewise driven counterclockwise. During the second half of the revolution of the clutch the link 22 returns the arm 23 clockwise to its normal position of Fig. 2, the shaft 24 being also returned clockwise to its normal position during the return stroke of the machine cycle by springs (not shown) under control of the usual dashpot (not shown). The shaft 24 has fixed thereon an arm 28 which has a spring connection 29 with a plate 30 secured to the 800 shaft of the machine, whereby the latter shaft is rocked counterclockwise as the shaft 24 is rocked counterclockwise during the forward stroke of the machine cycle and returned clockwise as the shaft 24 is returned clockwise during the return stroke of the machine cycle.

Amounts to be entered are set up on the keyboard having a plurality of vertical rows of amount keys 40. Each row of amount keys 40 contains nine keys numbered from 1 to 9, in order from bottom to top. Each amount key 40, when depressed, rocks an individual detent member 41 which cooperates with the remainder of the usual key latching mechanism (not shown). The detent 41 for each amount key except the "9" key in each bank is connected with the rearward upper end of a stop wire 42, the forward end of which is bent into a hook shape and guided in the appropriate one of a series of eight slots in each of a pair of the usual comb plates 43 for the respective bank of keys so that, when an amount key is depressed, the transverse portion of the forward hooked end of the corresponding stop wire 42 is moved rearwardly into the path of a shoulder (not shown) on the usual actuator sector 45 for the corresponding bank or numerical order of the machine. Each actuator sector 45 is carried by the forward arm of the respective one of a series of levers 46 pivoted on the shaft 47 and urged clockwise by the usual springs 48.

The amount-entering cycles of machine operation are initiated by depressions of one of the motor bars, such as M and U. During the forward stroke of the machine cycle a cam slotted plate 50 secured on the 800 shaft rocks counterclockwise with the latter and imparts a clockwise motion to a bail 52 whose side arms are pivoted on the shaft 47, one of the side arms of said bail carrying a roller 51 engaging in the cam slot in the plate 50. The cross member of the bail 52 extends transversely beneath the forward arms of all of the levers 46, normally holding them in their normal positions of Figs. 1 and 2 at the counterclockwise extremities of their strokes. As the bail 52 is rocked clockwise during the forward stroke of the machine cycle, it permits each lever 46 and sector 45 to move clockwise unless stopped by the usual zero stop (not shown) or until stopped by engagement of the shoulder on the sector with the stop wire 42 of a depressed key 40 in a bank where a key 40 for any digit from "1" to "8" has been depressed, or to the full limit permitted by the bail 52 in any bank where a "9" key has been depressed.

The rearward arm of each lever 46 carries a series of type 55 for the numerals from "0" to "9" arranged thereon so that, when the bail 52 has reached the limit of its clockwise movement during the forward stroke of the machine cycle and the actuator sectors 45 and levers 46 have been arrested by the zero stops, the stop wires 42 or the bail 52 in the positions corresponding to the amount set up on the keyboard of the machine, the type 55 for printing such amount will be positioned along the printing line of a platen 56 carried by a traveling paper carriage 57 which is laterally movably mounted on a raceway 58 at the rear of the machine. After the type 55 corresponding to the amount set up on the keys 40 have thus been positioned at the printing line, they are driven against the platen by the usual printing hammers 60 pivoted on the shaft 61. The usual ink ribbon (not shown) inks the impressions made by the type whereby the amount is printed on the paper supported on the platen. The lateral movements of the carriage are effected by carriage tabulating and return mechanisms substantially as disclosed in Rinsche Patent 1,580,534.

During the return stroke of the machine cycle the bail 52 is returned counterclockwise to its normal position of Figs. 1 and 2 by the cam 50 secured to the 800 shaft and the levers 46 with the printing type 55 and actuator sectors 45 are correspondingly returned to their normal positions. Prior to such return movement of the actuator sectors 45 in an amount-entering machine cycle, an add-subtract totalizer 65 (Fig. 1) or crossfooter and/or one of a series of registers 66 may be meshed with the actuator racks to effect the entry of the amount therein during the return of the actuator sectors to normal. The construction and operation of the add-subtract crossfooter 65 and of the multiple registers 66 may be substantially as disclosed in Pasinski Patents 1,778,506 and 1,911,768.

The machine is provided with the usual total-taking control means (not shown) which may be governed either by the paper carriage or in part by the usual total and subtotal keys 67 and 68 in a total-taking or subtotal-taking machine cycle. The crossfooter 65 or register 66 from which the total or subtotal is to be taken is engaged with the actuators 45 prior to their descent in the forward stroke of the machine cycle, the zero stops for the actuator sectors being disabled to permit such movement of the actuator sectors, which then are arrested in positions determined by the extent to which the register or crossfooter pinions are permitted to rotate before they are stopped in their "0" positions. The printing type 55 corresponding to the amount thus withdrawn from the crossfooter or register are thereby positioned along the printing line of the platen prior to the firing of the hammers 60 near the end of the forward stroke of the total-taking or subtotal-taking machine cycle. The crossfooter or totalizer pinions from which the total or subtotal is taken are disengaged from the actuators prior to the return movement of the latter in a total-taking cycle to leave the pinions in their "0" positions, but are permitted to remain engaged with said actuators during the return stroke of the subtotal-taking cycle whereby the amount withdrawn is again returned to the crossfooter or register pinions.

In the Burroughs "High Keyboard" machine, as is well known, the levers 46 are normally positioned, while the machine is at rest, so that the "0" type are positioned a step below the printing line of the platen and during the forward stroke of the machine cycle, the levers 46 must follow the bail 52 through one step of movement to bring the "0" type at the printing line before moving any of the actuator sectors 45 below their normal positions. The connections between the levers 46 and the corresponding sectors 45 are, as is well known, stud-and-slot connections, permitting such a step of relative movement between each lever 46 and the corresponding actuator 45 for the purpose of permitting each actuator, for tens-transfer purposes, to move one step upwardly above its normal "0" position at the end of the return stroke of an amount-entering machine cycle.

Each printing hammer 60 is formed with a cam slot 70 in which is engaged a stud 71 on a firing member 72 pivoted on a shaft 73, the shafts 61 and 73 being supported in the two side frame members 75 of the printing mechanism. The firing member 72 is normally urged counterclockwise by a spring 76 connected at its lower end with said firing member. The firing member, however, is normally held in its position of Figs. 1 and 2 and against clockwise movement by a latch 77, pivoted on a shaft 77' (Fig. 3) carried in the side frame members 75. The stud 71, therefore, normally holds the printing hammer 60 in its normal position of Figs. 1 and 2.

The upper end of the spring 76 is connected to a lower rearward arm of a pawl 78 pivoted on a rod 79 supported in the upper ends of a pair of arms 80 which are pivoted on a shaft 81 also supported in the side frames 75 of the printing mechanism. The arms 80 and rod 79 form a rigid bail which is urged counterclockwise by a spring 82 against a fixed stud 139. The rearward end of each pawl 78 has a hook shoulder 83 (Fig. 3) to engage a shoulder 84 on the upper edge of the firing member latch 77. Said pawl 78 also has a forwardly extending arm with a cam portion 85 to cooperate with a cam edge 86 on the lower side of the rearward arm of the lever 46 for the corresponding numerical order.

The lower end of the left-hand arm 80 extends below the shaft 81 into the path of a stud 87 carried by a plate 88 secured on the 800 shaft so that, when the bail 52 reaches the limit of its clockwise stroke during the forward stroke of the machine cycle and the appropriate type have been positioned along the printing line of the platen, the stud 87 engages the lower end of the arm 80 and causes the rod 79 to be swung forwardly. The lever 46 for any bank of amount keys 40 in which no key has been depressed in an amount-entering cycle, or which is meshed with a crossfooter or register pinion already standing at "0" at the beginning of a total-taking or subtotal-taking cycle, will thus be arrested in the position where the "0" type on the rear end thereof is at the printing line. When the rod 79 is rocked forwardly, the cam portion 86 of the under edge of the rear arm of any lever 46 arrested in the "0" position will be engaged by the portion 85 of the pawl 78 for the corresponding order and will rock said pawl clockwise before the latter has moved sufficiently forwardly to engage the shoulder 84 on the latch 77 so that said latch will not be tripped by the pawl 78 during the further forward movement of the rod 79. However, in any order where the lever 46 has moved beyond its "0" position, the hooked rear end of the pawl 78 will engage the shoulder 84 of the latch 77 and rock the latter about the shaft 77' to release the firing member 72 which is then rocked counterclockwise by its spring 76 whereby its stud 71 swings the corresponding printing hammer 60 counterclockwise.

The lower ends of the cam slots 70 in the printing hammers 60 are enlarged in such a manner that the positive drive of the printing hammer by the stud 71 on its firing member ceases just before the printing hammer actually strikes the type so that the driving of the type toward the platen to effect the actual printing impression is effected not by a positive drive from the firing member, but rather by the momentum of the hammer. Each latch member 77 except any one which is immediately to the left of a "split" in the printing mechanism has a laterally bent tail 90 which overlaps a straight tail 91 of the latch member 77 in the next lower order to the right, so that if any latch 77 is rocked by its pawl 78 to cause the printing of a digit from "1" to "9", the latch 77 in any lower order in which a "0" type is positioned at the printing line will be rocked by the next higher latch 77 to cause the "0" to be printed.

During the return stroke of the machine cycle, as the 800 shaft returns clockwise to its normal position, a link 95 connected at one end to the plate 88 and at its other end to a side arm of a bail 96 pivoted on the shaft 73 rocks said bail 96 clockwise to cause a cross rod of said bail to engage the forward arms of the operated firing members 72 and return such firing members clockwise to their normal positions in latched engagement with the latches 77, the rod 79 carrying the pawls 78 being also returned rearward to normal position by its spring 82.

*Safeguard printing*

For safeguard printing purposes, safeguard character type 100 are positioned on the rear ends of the levers 46 in those orders in which it is desired to print safeguard characters. In the particular construction illustrated, by way of example, in the accompanying drawings, "$" type are positioned above the regular "0" type in the tens and hundreds of dollars orders and an extra "0" type is positioned above the regular "0" type in the dollars order. Means are also provided which, in any safeguard printing operation of the machine, will, just prior to the firing of the printing hammers 60, return the levers 46 to their normal positions with their regular "0" type one step below the printing line of the platen in at least one order higher than the highest order of the amount to be printed, provided that the number of orders in the amount does not exceed four. Such an arrangement is suitable for machines intended for use in printing checks of amounts not to exceed $99.99. It will be noted that the digit type in the fifth lowest order are, in that case, not intended to be used in check printing or other safeguard printing operations, and it will also be noted that Figs. 4, 5 and 6 show the rear end of the lever 46 for the next higher (sixth) order with digit type thereon, but, as has been mentioned previously, it is desirable that the machine shall be usable for other than safeguard printing work and that, in such other work, it may be necessary to print amounts or figures of more than four numerical orders. However, it will be apparent that the safeguard printing provisions may be applied to any desired number of orders of the machine to permit the printing of safeguard characters to the left of amounts of any desired number of numerical orders. If safeguard character type are provided only in those orders where required to permit the printing of safeguard characters to the left of the largest amounts intended to be printed in safeguard printing operations, the absence of a safeguard character at the left of the amount printed by the machine on any check or other paper where safeguard printing would be required will help to direct attention to the question of whether the amount of the check or other paper is in excess of any which the machine operator is authorized to issue.

Means are also provided, as will hereinafter be described, to effect, in safeguard printing operations, the firing of the printing hammer in the next order higher than the highest order of the amount to be printed in such safeguard printing operation.

The means for returning appropriate ones of the levers 46 to their normal positions prior to the firing of the printing hammers 60 in safeguard printing operations comprises a series of pawls 101 pivotally supported on a shaft 102 (Fig. 2) fixed in a pair of arms 103 pivoted on a shaft 104 supported in the printing mechanism side frame members 75. Each pawl 101 is urged counterclockwise by a spring 99. The shaft 102 and arms 103 form a rigid bail which is urged clockwise in Fig. 2 by a spring 105 to hold the lower cam edge of a forward extension of the left-hand arm 103 in contact with a stud 106 carried by an arm 107 secured to the left-hand side arm of the bail 52. In the illustrated example there are five pawls 101, each having a depending arm 108, the lower end of which is adapted to cooperate with a stud 109 on a respective one of the five lowest order levers 46. Each of the pawls has a rearwardly extending arm 110 having on its upper and lower edges, respectively, two lugs 111 (Figs. 3 and 4) bent laterally to the left, as viewed from the front of the machine, and each of said rearwardly extending arms 110 except that of the lowest order pawl 101 carries a stud 112 extending to the right between the two lateral lugs 111 of the next lower order pawl 101.

While the machine is at rest the stud 106 is under the rearmost step a of the lower cam edge of the arm 103 and the shaft 102 with the pawls 101 carried thereby occupy their uppermost positions where a cam portion 114 of the forward edge of the depending arm 108 of each pawl engages against a fixed bar 115 extending between the side frames 75 of the printing mechanism to hold the lower ends of the depending arms of all the pawls 101 rearward of the paths of movement of the studs 109 on the levers 46. The three steps a, b and c on the lower cam edge of the arm 103 are so arranged that the shaft 102 and pawls 101 are held in their uppermost positions until the bail 52 is moved far enough to permit the rear ends of the levers 46 for orders in which digits from "1" to "9" are to be printed to move substantially above the positions where the regular "0" type on the rear ends of said levers would be at the printing line of the platen, after which the stud 106 moves onto the step b of the cam edge of the arm 103 to lower the shaft 102 and pawls 101 to such an extent that the cam projections 114 on the forward edges of the depending arms 108 of the pawls 101 move below the cross member 115, but the lower ends of the arms 108 in orders in which the levers 46 have moved beyond the "0" printing positions are then blocked against forward movement by the studs 109 on said levers 46, whereas the lower ends of the depending arms 108 of the pawls 101 in orders in which the levers 46 have been arrested with their "0" types at the printing line of the platen are still sufficiently higher than the studs 109 on said levers so that they can swing forwardly without interference from said studs. However, the studs 112 and lateral lugs 111 on the rearwardly extending arms 108 of the pawls 101 are so arranged, as shown in Figs. 4, 5, 6 and 7, that the stud 112 on any pawl 101 which is held against counterclockwise movement will hold the pawls 101 of all lower orders against counterclockwise movement, and the highest order pawl which is held against counterclockwise movement by a stud 109 on the lever 46 for the corresponding order will permit counterclockwise movement of the next higher order pawl 101 only sufficiently to permit the lower end of the depending arm 108 of said next higher order pawl to take a position directly above the stud 109 on its lever 46, whereas the pawls 101 of any still higher orders will be permitted to rock counterclockwise sufficiently to place the lower ends of their depending arms 108 forwardly of the studs 109 on the levers 46 for such higher orders. Subsequently, but prior to the firing of the printing hammers, the stud 106 moves on to step c of the cam edge of the arm 103 and thereby depresses the shaft 102 and pawls 101 sufficiently to cause the pawls 101, whose depending arms 108 are vertically aligned with the studs 109 on their levers 46, to depress the rear ends of such levers 46 and return such levers to their normal positions where the added safeguard printing type 100 on the rear ends of such levers are at the printing line of the platen at the time the printing hammers 60 are fired.

Figs. 3 and 4 illustrate the positions of the parts at the time the printing hammers 60 are fired in a safeguard printing operation when the characters corresponding to an amount of ten cents are to be printed. It will be noted that, because the added type on the units of dollars order lever 46 is a "0" type, a "0" will be printed in the units of dollars order. Such arrangement is adopted when it is desired to print a "0" in the units of dollars order in any safeguard printing operation in which the amount to be printed is less than a dollar. When such an arrangement is adopted, it is desirable to print "$" character immediately to the left of the "0" in the units of dollars order. It is also desirable to print a "0" in the tens of cents order if, in any case, the amount to be printed is less than ten cents. For these purposes, a small pin 120 projects from the right end of the stud 112 on the tens of cents order pawl 101 through the rearward arm 110 of the units of cents order pawl 101 whereby these two lowest order pawls 101 are pinned together to rock as a unit on the shaft 102. Also, the rearward arm 110 of the tens of cents order pawl 101 has at its rear end a leftwardly bent projection 121 which is positioned under a rearward extension 122 of the rear arm 110 of the tens of dollars order pawl 101. While the parts are in their normal positions with the machine at rest, there is sufficient clearance between the projection 121 and extension 122 to permit the tens of dollars order pawl 101 to be rocked during a machine operation sufficiently to place the lower end of its downward arm 108 above the stud 109 on the tens of dollars order lever 46 while the pawls 101 for the two lowest orders are held against counterclockwise rotation by the stud 109 on either of the two lowest order levers 46 being positioned in front of the depending arms 108 of either of said two lowest order pawls 101.

Thus, whenever an amount less than one dollar is to be printed, either one or the other of the two "0" types on the units of dollars order lever 46 will be positioned at the printing line and the pawl 101 for the tens of dollars order will be positioned above the stud 109 on the lever 46 for that order and will, prior to the firing of the printing hammers, return the rear end of said lever downwardly to its normal position to place the "$" type thereon at the printing line.

The relative positions of the pawls 101 when an amount of one dollar or more, but less than ten dollars, is to be printed, is illustrated in Fig. 6. In such a case, the stud 109 on the units of dollars order lever 46 will be elevated sufficiently prior to the movement of the stud 106 onto the middle cam surface b on the arm 103 to prevent forward movement of the depending arm 108 of the pawl 101 in the units of dollars order, and the latter pawl will permit only sufficient forward movement of the depending arm 108 of the tens of dollars order pawl 101 to position the lower end of said arm 108 above the stud 109 on the tens of dollars order lever 46.

The positions of the pawls in an operation for printing an amount of ten dollars or more, but less than one hundred dollars, are shown in Fig. 7.

It has already been explained that the rear end of any lever 46 which does not move above its regular "0" printing position will, by reason of its cam edge 86, rock the pawl 78 for the corresponding order, as the shaft 79 on which said pawl is pivoted is moved forwardly, to prevent the hooked rear end of said pawl 78 from engaging the shoulder 84 on the firing member latch 77 and tripping the latter during the printing operation. However, as also previously mentioned, it is necessary to fire the printing hammer 60 for an order higher than the highest order of the amount to be printed to effect the printing of a safeguard character "$." With the particular arrangement above described, the printing of a "$" is required in the tens of dollars order when printing any amount less than ten dollars, and a "$" must be printed in the hundreds of dollars order when printing any amount of ten dollars or more, but less than one hundred dollars. For this purpose, the lower edges of the forward ends of the pawls 78 in the tens of dollars and hundreds of dollars orders are formed with shoulders 125. When either of the levers 46 in the tens of dollars and hundreds of dollars orders is restored to its normal or safeguard character printing position by the pawl 101 for that order, the pawl 78, as its shaft 79 is moved forwardly, will be rocked further clockwise than would be the case if the lever 46 for that order were in its "0" printing position. Such further clockwise rocking of the pawl 78 places the shoulder 125 on said pawl behind a lateral lug 126 on a link 127 which is pivotally connected at its rear end with the upper portion of the latch 77 for the corresponding order, and is slidably guided on a rod 128 supported in the side frames 15 of the printing mechanism so that, during the latter portion of the forward movement of the shaft 79 and pawls 78, the link 127 will be moved forwardly to rock the latch 77 and release the firing member 72 to actuate the printing hammer 60 in a corresponding order whereby the "$" type positioned at the printing line of the platen is struck against the paper to print a "$."

*Normalizing safeguard printing means*

As previously mentioned, it is frequently desirable to eliminate the printing of safeguard symbols or characters to the left of amounts when the machine is being used for ordinary calculating machine work not involving safeguard printing and/or to eliminate the printing of safeguard characters or symbols to the left of amounts on business records which may be produced by the machine concurrently with the filling in of checks or other documents on which the printing of safeguard symbols or characters to the left of amounts may be desired. For this purpose, a stud 130 (Fig. 3) positioned between the two leftwardly extending lateral lugs 111 on the rear arm 110 of the pawl 101 for the highest order of the safeguard printing control, is carried by one lateral arm of a yoke member 131 pivoted on the shaft 104. A second lateral arm of the yoke 131 extends downwardly behind a stud 132 on the upper arm of a bell crank lever 133 pivoted on a fixed stud 134 and having a forwardly extending arm the end of which is positioned above the camshaft 135. A pinion 136 fixed on the end of the camshaft 135 meshes with rack teeth on the upper edge of one end of a slide 137 forwardly and rearwardly movable on fixed studs 138 and 139 supported in the left-hand side plate 75 of the printing mechanism frame and in the end of the shaft 77', respectively. It should be noted that said left-hand side plate 75 has been omitted from Fig. 2 to permit clear illustration of members located between the two plates 75. The slide 137 is urged forwardly to the position of Fig. 2 by a spring 148, referred to hereinafter, to place the shaft in a rotary position where a cam projection 141 on the shaft 135 elevates the lower forward arm of the bell crank 133 and thus rocks the yoke member 131 clockwise to the position of Fig. 2 where the stud 130 holds the highest order pawl 101 and thus also all of the lower order pawls 101 against movement counterclockwise from their normal positions of Fig. 2.

With the above-described arrangement, while the slide 137 remains in its normal forward position, the lower ends of the arms 108 of the pawls 101 will at all times be held rearwardly of the studs 109 on the levers 46 whereby the rear ends of said levers will, in each machine operation, be permitted to move upwardly at least to their normal "0" printing positions whereby the safeguard symbol or character type 100 will always be elevated above the printing line of the platen, and whereby also the printing hammer 60 in any order to the left of the highest order of the amount to be printed will not be fired, inasmuch as the rear end of the lever 46 for such order will not be depressed to cause engagement of the shoulder 125 on the pawl 78 for such order with the lug 126 on the corresponding link 127, although said lever 46, being in its "0" printing position, will prevent engagement of the rearward hooked end of the pawl 78 with the shoulder 84 on the corresponding latch. When, however, the slide 137 is moved rearwardly to rotate the camshaft 135 sufficiently to remove the cam projection 141 from beneath the forward lower arm of the bell crank 133, the pawls 101 will be permitted to rock counterclockwise out of their normal positions when the shaft 102 is depressed during the machine operation, except as such rocking of the pawls 101 may be blocked, as previously described, by a stud 109 in any order in which the rear end of the lever 46 is elevated above its regular "0" printing position, as well as in any lower order.

At this point it should be noted that the enabling and disabling of the means for causing the firing of a printing hammer 60 in the next order to the left of the highest order of an amount being printed is automatic in accordance with the condition of the means, including the pawls 101, which control the positioning of the safeguard character or symbol type 100 at the printing line so that, when the latter means is conditioned to cause the positioning of safeguard character type at the printing line for safeguard printing operations, the means for firing the hammer in the order next higher than the highest order of the amount to be printed is automatically enabled for firing such hammer, whereas, when the means controlling the positioning of the safeguard character type is normalized so that no safeguard type will be positioned at the printing line of the platen at the time of the operation of the printing mechanism during a machine cycle, the means for firing the hammer in the order next higher to the highest order of the amount being printed is automatically disabled and will not fire such hammer.

*Automatic control of normalizing of safeguard printing control*

In machines with traveling paper carriages, particularly where checks or other documents on which safeguard printing is to be effected are passed around one portion of the platen and business record sheets are passed around another portion of the platen, the condition of the safeguard printing control means may be controlled automatically in accordance with the position of the paper carriage, that is, automatically in accordance with the condition of the columnar printing control means. For this purpose, a stud 145 on the rear end of the slide 137 is engaged by the upper end of the bell crank lever 146, which is pivoted on a fixed stud 147 on the machine frame and urged clockwise in Fig. 2 by a spring 148, whereby said spring also urges the slide 137 forwardly. A short rearwardly extending arm 150 of the lever engages in a slot in one arm 151 (Fig. 1) of a yoke member 152 pivoted on a stud 153 carried by the back plate of the machine frame. A second arm 154 of the yoke member is positioned in the path of travel of one or more control rolls 155 mounted on the paper carriage 57 whereby, in a desired columnar position or positions of the paper carriage, depending upon the positioning of the roll or rolls 155 on the carriage, the arm 154 will be depressed by a roll 155 to rock the bell crank 146, 150 counterclockwise whereby the slide 137 will be pulled rearwardly through the spring 149 which is connected between the arm 146 and slide 147. Thereby the camshaft 135 is rotated to enable the safeguard printing control means to cause safeguard printing in machine operations performed when the paper carriage is in any columnar position where the control roll is located to depress the arm 154 to the required extent. To permit the carriage to remain stationary in such a columnar position, the carriage tabulating mechanism may be disabled by depression of a "Carriage Normal" key as disclosed in Lundgren Patent 1,195,599 wherein the "Carriage Normal" key is numbered 140.

*Manual control of safeguard printing control means*

The condition of the safeguard printing control means may also be controlled manually, this being particularly desirable in some machines, intended for only part-time use on work requiring safeguard printing and to permit the most convenient use of the machine at other times for ordinary calculating machine work with normal printing. In the illustrated machine, the stem 160 of the upper motor bar U is connected with an arm 161 fixed on a shaft 162 journaled in the side plates of the machine frame. A second arm 163 fixed on the shaft 162 has its lower end positioned in front of a stud 164 on the slide 137 so that, upon depression of the upper motor bar, the shaft 162 is rocked clockwise and the slide 137 moved rearwardly to place the safeguard printing control means in safeguard printing condition. In the Burroughs "High Keyboard" machine, as well known, the motor bars, when depressed to initiate machine operations, are latched in depressed position through a portion of the machine cycle extending beyond the point at which the printing hammers are fired. With the construction described, safeguard printing will be effected in any machine operation initiated by depression of the upper motor bar U, whereas regular printing without the printing of safeguard characters or symbols will be effected in any machine operation initiated by depression of the regular motor bar, provided that the slide 137 is not held in a rearward position by a roll 155.

*Variable elimination of printing in selected groups of orders*

For certain types of work it is desirable to eliminate printing in selected groups of orders in selected operations of the machine. One illustration is given in Fig. 9, which shows an example of work performed by the machine in printing the amount of the gross earnings, the deductions and the net pay of an employee on the stub of a pay check and then printing the amount of the employee's pay on the pay check. The pay check form used in the example is one having the words "Dollars and" and the word "Cents" printed on the check with a space between the words "And" and "Cents" so that, in filling in the amount of the check, the dollars portion of the amount is to be printed before the word "Dollars" and preceded by a safeguard character or symbol, and the cents portion of the amount is to be printed between the words "And" and "Cents," and the entire amount, preceded by a safeguard character or symbol, is to be printed after the word "Cents." At the time of printing the dollars portion of the amount before the word "Dollars," printing in the dimes and pennies orders is prevented, and at the time of printing in the cents portion of the amount before the word "Cents" printing in orders higher than the dimes order is prevented. In the illustrated machine this selective printing elimination or so-called "hammer block" in selected groups of orders is automatically controlled by the paper carriage in accordance with the columnar positions of the carriage.

The slide 137, which, as previously mentioned, is controlled by the rolls 155 on the paper carriage, carries a stud 170 (Fig. 1) which underlies the rearward arms of two three-armed levers 171 and 172 pivoted on the fixed stud 139 and urged counterclockwise into engagement with the stud 170 by springs 173 connected at their rearward ends with the downward arms of said three-armed levers. Each of the levers 171, 172 has a forwardly extending third arm provided at its end with a downwardly and forwardly inclined cam edge contacting with studs 174 and 175, respectively, carried by the respective ones of two bails 176 and 177, the side arms of both of which are pivotally supported on a pair of studs 178 secured in the side plates 75 of the printing mechanism frame. The springs 173, the rear ends of which are connected to the three-armed levers 171 and 172, respectively, are connected at their forward ends to the bails 176 and 177, respectively, above the pivotal axis of said bails to urge the latter counterclockwise to maintain the studs 174 and 175 in contact with the forward arms of the levers 171 and 172.

The rear arms of the three-armed levers 171 and 172 are formed with notches 181 and 182, respectively, which are so located with reference to the stud 170 on the slide 137 that, when the slide is in the normal forward position which it occupies when no roll 155 on the carriage is in engagement with the arm 154, the stud is engaged by the straight lower edges of the rearward arms of the members 171 and 172 forwardly of both notches 181 and 182, but when the slide 137 is moved one position rearwardly by engagement of the smallest size roll 155 with the arm 154, the stud 170, while still engaging the straight lower edge of the member 172 forwardly of the notch 182, is, however, aligned with the notch 181 in the member 171, permitting the spring 173 for said lever 171 to rock the latter counterclockwise whereby its forward cam arm, acting on the stud 174, cams the bail 176 clockwise. Thereby, a portion of the rear edge of the cross piece of the bail 176 is moved over the forward ends of the forward arms of the hammer firing members 72 for the pennies and dimes orders of the printing mechanism, whereby printing in the pennies and dimes orders is blocked, even if the latches 77 in said orders are tripped to release their firing members 72. The rear edge of the cross piece of the bail 176 is cut away as at 183 so as not to interfere with the firing members 72 in those orders in which printing is desired when the paper carriage is in the columnar position where the small roll 155 acts on the arm 154.

When a medium size roll 155 engages the arm 154 to move the slide to its second position rearwardly of its normal position, the stud 170 moves rearwardly of the notch 181 and cams the three-armed lever 171 clockwise to its normal position of Fig. 1 and is aligned with the notch 182 in the rearward three-armed lever of the member 172, whereby the latter is permitted to be rocked counterclockwise by its spring 173 so that the forward cam end of said member 172, acting on the stud 175, rocks the bail 177 clockwise and positions the rearward edge of the cross piece of said bail 177 over the forward ends of the forward arms of the hammer firing members 72 in the units of dollars and all higher orders to eliminate printing in those orders. The cross piece of the bail 177 is notched as at 184 so as not to interfere with the operation of the firing members 72 in the pennies and dimes orders whereby, when a medium size roll 155 is positioned over the arm 154, printing is effected only in the pennies and dimes orders.

When the largest size roll 155 is positioned over the arm 154, the slide 137 and stud 170 are moved to a third position rearwardly of their normal positions where the stud 170 engages the straight portion of the lower edge of both three-armed levers 171 and 172 rearwardly of both notches 181 and 182 to hold both of said three-armed levers in their normal positions of Fig. 1 to permit printing by all orders of the printing mechanism.

*Example of work*

In the setup of the carriage controls of safeguard printing and printing elimination illustrated in Fig. 9, no control rolls 155 are provided for the first three columnar positions of the paper carriage where the gross amount of earnings, the deductions and the net amount of earnings, respectively, are printed on the check stub. When the paper carriage is in one of these first three columnar positions, the slide 137, shaft 135 and stud 170 will, therefore, occupy the positions shown in Fig. 1 where the safeguard printing control is disabled by the cam projection 141 raising the lower forward end of the lever 133 and the hammer block bails 176 and 177 are both disabled by reason of the stud 170 being in contact with the under edges of the rear arms of the levers 171 and 172 forwardly of both notches 181 and 182.

In the fourth columnar position of the carriage where the dollars portion of the amount is to be printed in front of the word "Dollars" on the check and preceded by a safeguard symbol, a small roll 155 on the carriage depresses the arm 154 to move the slide 137 rearwardly to position the stud 170 in the notch 181 and rotate the shaft 135 a quarter revolution clockwise to remove the cam projection 141 from beneath the forward end of the lever 133, whereby the safeguard printing control is enabled to cause the printing of a "$" immediately to the left of the highest order of the dollars portion of the amount, but printing of the cents portion of the amount is eliminated.

In the fifth columnar position of the carriage a medium size roll 155 moves the slide 137 further rearward to rotate the shaft 135 another quarter revolution clockwise and move the stud 170 into the notch 182 in the lever 172 whereby, though the safeguard printing control means still remains in active condition and a "$" type in the hundreds of dollars order will be indexed at the printing line, printing in all orders except the pennies and dimes orders is eliminated by the bail 177 whereby only the cents portion of the amount will be printed between the words "And" and "Cents."

In the sixth columnar position of the carriage, a large size roll 155 moves the slide 137 still farther rearwardly to rotate the shaft 135 another quarter revolution clockwise where the cam projection 141 still does not contact the lever 133 but leaves the safeguard printing control means active, and where the stud 170 engages the lower edges of the levers 171 and 172 rearwardly of both notches 181 and 182 whereby the entire amount of the check and a "$" immediately to the left of such amount will be printed on the check to the right of the word "Cents."

While the construction above described by way of example only is admirably suited for the purposes referred to, it will be apparent to those skilled in the art that the construction is susceptible of various modifications which may be found particularly convenient in given circumstances. For example, whereas the safeguard printing control means in the construction illustrated and described above is normally in a disabled or normalized condition but may be placed in an effective safeguard printing condition by either manual or automatic control, or both, that may be reversed so that the safeguard printing control means is normally in a safeguard printing condition but capable of being normalized under either automatic or manual control. This may be effected by simply changing the position of the control cam 141 on the camshaft 135 or even by unmeshing the pinion 136 on said shaft from the rack on the slide 137 and rotating said shaft 135 to the required extent before remeshing the pinion 136 with the rack. Also, instead of effecting the manual control of the condition of the safeguard printing control means by means of a motor bar for single operations initiated by depression of such motor bar, the position of the slide 137 and thereby the condition of the safeguard printing control means may easily be controlled by a manipulative member releasably latchable in any of its positions of adjustment.

The particular form and arrangement of the safeguard printing control members illustrated in Figs. 3 to 7 is especially well suited for use in work involving different systems of currency. In the accompanying drawings the mechanism has been illustrated as used for safeguard printing of amounts in a decimal currency, specifically United States currency, although it will be apparent that, by the mere substitution of other appropriate safeguard character types for the "$" types, the machine may be used for printing amounts in other decimal currencies. It is to be noted, also, that the same mechanism may be used for printing amounts in a nondecimal currency, specifically English currency, by merely replacing the "0" type 100 in the third lowest order by a "–" type and by placing a "." on each of the type 55 in the lowest order and in the third lowest order, as well as by replacing the "$" type 100 in the fourth and fifth orders by type bearing the English pound symbol "£". After such changes of type the machine will print, for examples, the amount of one pound five shillings as "£1.05" and fifteen shillings as "£–.15".

If the machine is also to print pence, an extra order is added to the machine at the right of the illustrated orders, the multiple register and cross-footer pinions, actuator segment and type carrier for the added order being of "twelve pitch" construction so that amounts from "1" to "12" may be entered and the figures from "0" to "12" may be printed in the added order. Also, a pawl 101 like the illustrated lowest order pawl 101 is added to cooperate with a stud on the arm of the added type carrier, said added pawl being also connected by a lengthened pin 120 to both of the pawls 101 for both of the shillings order to move in fixed relation with the latter pawls. With such provisions, an amount of, for example twenty pounds, nine shillings and ten pence will be printed as "£20.09.10."

Various other modifications suitable to particular circumstances will be readily apparent to those skilled in the art.

I claim:

1. A machine of the character specified having a platen with a printing line, a plurality of type carriers each having a normal position, a series of type on each type carrier, means for moving said type carriers from and returning them to their normal positions, means for selectively controlling said movements away from normal of said type carriers to position selected type at said printing line in accordance with amounts to be printed, and means controlled directly by each of said type carriers and conditioned by the type carrier for the highest order of the amount to be printed to act directly upon the type carrier of the next higher order to move the latter to a position to place a predetermined type thereon at said printing line.

2. A machine of the character specified having a platen with a printing line, a plurality of type carriers each having a normal position, a series of type on each type carrier, means for moving said type carriers from and returning them to their normal positions, means for selectively controlling said movements away from normal to position selected types at said printing line in accordance with amounts to be printed, a control element on each of said type carriers to move therewith, a movable support, a control member for each of said type carriers movably mounted on said support and normally out of but adjacent the path of movement of said control element on said type carrier, means to move said control members crosswise of the paths of said control elements after the type carrier for the highest order of the amount to be printed has moved away from its normal position to position its control element for engagement by said control member, connections between control members of adjacent orders whereby the control member of the order next higher than that of said control member engaged by said control element is held in the path of movement of the control element for said next higher order, and means to move said support to cause said control member of said next higher order to move the control element and type carrier of said next higher order to a predetermined position.

3. A machine of the character specified having a platen with a printing line, a plurality of type carriers each having a normal position, a series of type on each type carrier, means for moving said type carriers from and returning them to their normal positions, means for selectively positioning said type carriers to position selected type thereon at said printing line in accordance with amounts to be printed, an abutment on each of said type carriers to move therewith, a movable support, a pawl for each of said type carriers pivotally mounted on said support and normally out of but adjacent the path of movement of said abutment on said type carrier, means to rock said pawls crosswise of the paths of said abutments after the type carrier for the highest order of the amount to be printed has moved away from its normal position to position its abutment for engagement by said pawl, connections between pawls of adjacent orders whereby the pawl of the order next higher than that of said pawl engaged by said abutment is held in a position in the path of movement of the abutment for said next higher order, and means to move said support to cause said pawl of said next higher order to move the abutment and type carrier of said next higher order to a predetermined position.

4. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively controlling said movements away from normal of said type carriers to position selected type thereon at said printing line in accordance with amounts to be printed, and means controlled directly by each of said type carriers and conditioned by the type carrier for the highest order of the amount to be printed to act directly upon the type carrier of the next higher order and actuated from said driving means after selective positioning of said type carriers in a machine cycle to move said type carrier of next higher order to a position to place a predetermined type thereon at said printing line.

5. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively positioning said type carriers to position selected type thereon at said printing line in accordance with amounts to be printed, a control element on each of said type carriers to move therewith, a movable support, a control member for each of said type carriers movably mounted on said support and normally out of but adjacent the path of movement of said control element on said type carrier, means to move said control members crosswise of the paths of said control elements after the type carrier for the highest order of the amount to be printed has moved away from its normal position to position its control element to be engaged by said control member, connections between control members of adjacent orders whereby the control member of the order next higher than that of said control member engaged by said control element is held in a position in the path of movement of the control element for said next higher order, and means actuated from said driving means in machine cycles to move said support to cause said control member of said next higher order to move the control element and type carrier of said next higher order to a predetermined position.

6. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively controlling said movements away from normal of said type carriers to position selected type thereon at said printing line in accordance with amounts to be printed, means controlled directly by each of said type carriers and conditioned by the type carrier for the highest order of the amount to be printed to act directly upon the type carrier of the next higher order and actuated from said driving means after selective positioning of said type carriers in a machine cycle to move said type carrier of next higher order to a position to place a predetermined type thereon at said printing line, and means to enable and disable said type-carrier-controlled means.

7. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively positioning said type carriers to position selected type thereon at said printing line in accordance with amounts to be printed, a control element on each of said type carriers to move therewith, a movable support, a control member for each of said type carriers movably mounted on said support and normally out of but adjacent the path of movement of said control element on said type carrier, means to move said control members crosswise of the paths of said control elements after the type carrier for the highest order of the amount to be printed has moved away from its normal position to position its control element to be engaged by said control member, connections between control members of adjacent orders whereby the control member of the order next higher than that of said control member engaged by said control element is held in a position in the path of movement of the control element for said next higher order and all lower order control members are held against movement into said paths of said control elements for said lower orders, means actuated from said driving means in machine cycles to move said support to cause said control member of said next higher order to move the control element and type carrier of said next higher order to a predetermined position, and means to prevent movement of the highest order control member into the path of movement of the highest order control element in selected machine cycles.

8. A machine of the character specified having means for driving it through cycles of operation, a platen with a printing line, a traveling carriage supporting said platen, a plurality of type carriers each having a normal position, a series of type on each type carrier, means actuated from said driving means in machine cycles for moving said type carriers from and returning them to their normal positions, means for selectively controlling said movements away from normal of said type carriers to position selected type thereon at said printing line in accordance with amounts to be printed, means controlled directly by each of said type carriers and conditioned by the type carrier for the highest order of the amount to be printed to act directly upon the type carrier of the next higher order and actuated from said driving means after selective positioning of said type carriers in a machine cycle to move said type carrier of next higher order to a position to place a predetermined type thereon at said printing line, and means controlled by said carriage to enable and disable said type-carrier-controlled means.

9. A machine of the character specified having means for driving it through cycles of operation, a platen with a printing line, a traveling carriage supporting said platen, a plurality of type carriers each having a normal position, a series of type on each type carrier, means actuated from said driving means in machine cycles for moving said type carriers from and returning them to their normal positions, means for selectively controlling said movements away from normal of said type carriers to position selected type thereon at said printing line in accordance with amounts to be printed, means controlled directly by each of said type carriers and conditioned by the type carrier for the highest order of the amount to be printed to act directly upon the type carrier of the next higher order and actuated from said driving means after selective positioning of said type carriers in a machine cycle to move said type carrier of next higher order to a position to place a predetermined type thereon at said printing line, manipulative means, and means controlled by said manipulative means to enable and disable said type-carrier-controlled means.

10. A machine of the character specified having a platen with a printing line, a plurality of type carriers each having a normal position, a series of type on each type carrier, means for moving said type carriers from and returning them to their normal positions, means for selectively controlling said movements away from normal of said type carriers to position selected type at said printing line in accordance with amounts to be printed, means controlled directly by each of said type carriers and conditioned by the type carrier for the highest order of the amount to be printed to act directly upon the type carrier of the next higher order to move the latter to a position to place a predetermined type thereon at said printing line, printing impression means for each type carrier to operate on the type thereon positioned at said printing line, means controlled by said type carriers to actuate said printing impression means for orders comprised within the amount to be printed, and means controlled by said next higher order type carrier when the latter is in said predetermined position to cause actuation of the printing impression means for said next higher order.

11. A machine of the character specified having a platen with a printing line, a plurality of type carriers each having a normal position, a series of type on each type carrier, means for moving said type carriers from and returning them to their normal positions, means for selectively controlling said movements away from normal to position selected types at said printing line in accordance with amounts to be printed, a control element on each of said type carriers to move therewith, a movable support, a control member for each of said type carriers movably mounted on said support and normally out of but adjacent the path of movement of said control element on said type carrier, means to move said control members crosswise of the paths of said control elements after the type carrier for the highest order of the amount to be printed has moved away from its normal position to position its control element for engagement by said control member, connections between control members of adjacent orders whereby the control member of the order next higher than that of said control member engaged by said control element is held in the path of movement of the control element for said next higher order, means to move said support to cause said control member of said next higher order to move the control element and type carrier of said next higher order to a predetermined position, printing impression means for each type carrier to operate on the type thereon positioned at said printing line, means controlled by said type carriers to actuate said printing impression means for orders comprised within the amount to be printed, and means controlled by said next higher order type carrier when the latter is in said predetermined position to cause actuation of the printing impression means for said next higher order.

12. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively controlling said movements away from normal of said type carriers to position selected type at said printing line in accordance with amounts to be printed, means controlled directly by each of said type carriers and conditioned by the type carrier for the highest order of the amount to be printed to act directly upon the type carrier of the next higher order and actuated from said driving means to move the latter to a position to place a predetermined type thereon at said printing line, printing impression means for each type carrier to operate on the type thereon positioned at said printing line, means controlled by said type carriers and actuated from said driving means to actuate said printing impression means for orders comprised within the amount to be printed, means controlled by said next higher order type carrier when the latter is in said predetermined position to cause actuation of the printing impression means for said next higher order, and means to enable and disable said first-mentioned type-carrier-controlled means.

13. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively controlling said movements away from normal to position selected types at said printing line in accordance with amounts to be printed, a control element on each of said type carriers to move therewith, a movable support, a control member for each of said type carriers movably mounted on said support and normally out of but adjacent the path of movement of said control element on said type carrier, means to move said control members crosswise of the paths of said control elements after the type carrier for the highest order of the amount to be printed has moved away from its normal position to position its control element for engagement by said control member, connections between control members of adjacent orders whereby the control member of the order next higher than that of said control member engaged by said control element is held in the path of movement of the control element for said next higher order, means actuated from said driving means to move said support to cause said control member of said next higher order to move the control element and type carrier of said next higher order to a predetermined position, printing impression means for each type carrier to operate on the type thereon positioned at said printing line, means actuated from said driving means and controlled by said type carriers to actuate said printing impression means for orders comprised within the amount to be printed, means controlled by said next higher order type carrier when the latter is in said predetermined position to cause actuation of the printing impression means for said next higher order, and means conditionable to prevent movement of the highest order control member into the path of movement of the highest order control element in selected machine cycles.

14. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively controlling said movements away from normal of said type carriers to position selected type at said printing line in accordance with amounts to be printed, means controlled directly by each of said type carriers and conditioned by the type carrier for the highest order of the amount to be printed to act directly upon the type carrier of the next higher order and actuated from said driving means to move the latter to a position to place a predetermined type thereon at said printing line, printing impression means for each type carrier to operate on the type thereon positioned at said printing line, means controlled by said type carriers and actuated from said driving means to actuate said printing impression means for orders comprised within the amount to be printed, means controlled by said next higher order type carrier when the latter is in said predetermined position to cause actuation of the printing impression means for said next higher order, means operable to cause said drive means to drive said machine through a cycle of operation, and means controlled by said operable means to enable and disable said first-mentioned type-carrier-controlled means.

15. A machine of the character specified having means for driving it through cycles of operation, a platen with a printing line, a plurality of type carriers each having a normal position, a series of type on each type carrier, means actuated from said driving means in machine cycles for moving said type carriers from and returning them to their normal positions, means for selectively controlling said movements away from normal to position selected types at said printing line in accordance with amounts to be printed, a control element on each of said type carriers to move therewith, a movable support, a control member for each of said type carriers movably mounted on said support and normally out of but adjacent the path of movement of said control element on said type carrier, means to move said control members crosswise of the paths of said control elements after the type carrier for the highest order of the amount to be printed has moved away from its normal position to position its control element for engagement by said control member, connections between control members of adjacent orders whereby the control member of the order next higher than that of said control member engaged by said control element is held in the path of movement of the control element for said next higher order, means actuated from said driving means to move said support to cause said control member of said next higher order to move the control element and type carrier of said next higher order to a predetermined position, printing impression means for each type carrier to operate on the type thereon positioned at said printing line, means actuated from said driving means and controlled by said type carriers to actuate said printing impression means for orders comprised within the amount to be printed, means controlled by said next higher order type carrier when the latter is in said predetermined position to cause actuation of the printing impression means for said next higher order, means operable to cause said driving means to drive said machine through a cycle of operation, and means governed by said operable means to prevent movement of the highest order control member into the path of movement of the highest order control element in selected machine cycles.

16. A machine of the character specified, a platen having a printing line, a plural order printing mechanism having a type carrier for each order, a series of type on each type carrier, means for selectively positioning the type carrier of each order to position selected type thereon at the said printing line, a printing hammer for each type carrier, actuating means for each printing hammer, means for each order controlling said hammer-actuating means for said order and controlled by said type carrier for said order to cause printing actuation of the said hammer for said order if said type carrier for said order is in a predetermined position or in one direction therefrom, connections between said controlling means of successive orders to cause actuation of the printing hammers for all orders lower than the highest order hammer actuated, and means controlled by said type carriers to shift to a second predetermined position the higher order type carrier nearest the highest order type carrier positioned in or in one direction from said first-mentioned predetermined position, said controlling means having portions conditioned by said type carrier moved to said second predetermined position to cause the actuating means for said last-mentioned order to actuate the printing hammer for said order.

17. A machine of the character specified having means to drive it through cycles of operation, a platen having a printing line, a plural order printing mechanism including a type carrier for each order, a series of type on each of said type carriers, means operable by said driving means to move said type carriers from normal positions and return them to said normal positions in a machine cycle, means to selectively limit said movements of said type carriers to position selected types of said series at the printing line of said platen, a printing hammer for said type carrier, means controlled by said type carriers and actuated by said driving means to effect printing operation of the printing hammer for the highest order type carrier moved to or beyond a predetermined out-of-normal position and of all lower order hammers, a special type on each of a plurality of said type carriers, means controlled by the highest order type carrier moved more than a predetermined extent out of its normal position and actuated by said driving means to shift the nearest higher order type carrier having one of said special types to position said special type at said printing line, and means controlled by said type carriers having special types to cause printing operation of the printing hammer for said type carrier shifted to position its special type at said printing line.

13. A machine of the character specified, a platen having a printing line, a plural order printing mechanism having a type carrier for each order, a series of type on each type carrier, means for selectively positioning the type carrier of each order to position selected type thereon at the said printing line, a printing hammer for each type carrier, actuating means for each printing hammer, means for each order governing said hammer-actuating means for said order and conditioned by said type carrier for said order to cause printing actuation of the said hammer for said order if said type carrier for said order is in a predetermined position or in one direction therefrom, connections between said governing means of successive orders to cause actuation of the printing hammers for all orders lower than the highest order hammer actuated, means controlled by said type carriers to shift to a second predetermined position the higher order type carrier nearest the highest order type carrier positioned in or in one direction from said first-mentioned predetermined position, said governing means having portions conditioned by said type carrier moved to said second predetermined position to cause the actuating means for said last-mentioned order to actuate the printing hammer for said order, and conditionable means to disable and enable said type-carrier-controlled means.

19. A machine of the character specified having means to drive it through cycles of operation, a platen having a printing line, a plural order printing mechanism including a type carrier for each order, a series of type on each of said type carriers, means operable by said driving means to move said type carriers from normal positions and return them to said normal positions in a machine cycle, means to selectively limit said movements of said type carriers to position selected types of said series at the printing line of said platen, a printing hammer for said type carrier, means governed by said type carriers and actuated by said driving means to effect printing operation of the printing hammer for the highest order type carrier moved to or beyond a predetermined out-of-normal position and of all lower order hammers, a special type on each of a plurality of said type carriers, means controlled by the highest order type carrier moved more than a predetermined extent out of its normal position and actuated by said driving means to shift the nearest higher order type carrier having one of said special types to position said special type at said printing line, means governed by said type carriers having special types to cause printing operation of the printing hammer for said type carrier shifted to position its special type at said printing line, and settable means to enable and disable said type-carrier-controlled means.

ARTHUR J. FETTIG.